(12) United States Patent
Zhang et al.

(10) Patent No.: US 10,829,119 B1
(45) Date of Patent: Nov. 10, 2020

(54) EMERGENCY BRAKE CONTROL METHOD AND DEVICE, ECU AND VEHICLE

(71) Applicant: GREAT WALL MOTOR COMPANY LIMITED, Hebei (CN)

(72) Inventors: Shiliang Zhang, Hebei (CN); Shenhong Liu, Hebei (CN); Fanmao Kong, Hebei (CN); Xianglu Meng, Hebei (CN); Libo Wang, Hebei (CN)

(73) Assignee: Great Wall Motor Company Limited, Hebei (CN)

( * ) Notice: Subject to any disclaimer, the term of this patent is extended or adjusted under 35 U.S.C. 154(b) by 0 days.

(21) Appl. No.: 16/643,117

(22) PCT Filed: Aug. 30, 2018

(86) PCT No.: PCT/CN2018/103328
§ 371 (c)(1),
(2) Date: Feb. 28, 2020

(87) PCT Pub. No.: WO2019/042374
PCT Pub. Date: Mar. 7, 2019

(30) Foreign Application Priority Data

Aug. 30, 2017 (CN) .......................... 2017 1 0765303

(51) Int. Cl.
*B60W 30/18* (2012.01)
*B60Q 5/00* (2006.01)
(Continued)

(52) U.S. Cl.
CPC ......... *B60W 30/18109* (2013.01); *B60Q 1/44* (2013.01); *B60Q 5/005* (2013.01);
(Continued)

(58) Field of Classification Search
None
See application file for complete search history.

(56) References Cited

U.S. PATENT DOCUMENTS 8,322,473 B2 * 12/2012 Hilberer .................. B60T 7/122
180/65.265
8,770,328 B2 * 7/2014 Hilberer ................ B60W 10/06
180/65.265
(Continued)

FOREIGN PATENT DOCUMENTS

CN          1712285 A    12/2005
CN        101954909 A     1/2011
(Continued)

OTHER PUBLICATIONS

ISR for PCT/CN2018/103328 dated Nov. 19, 2018, 2 pages.
(Continued)

*Primary Examiner* — Dirk Wright
(74) *Attorney, Agent, or Firm* — Nixon Peabody LLP

(57) ABSTRACT

Disclosed are an emergency brake control method, device, ECU and vehicle. The method includes: when receiving a first trigger signal indicating that a vehicle enters a driving accompanying mode, activating the driving accompanying mode; and in the driving accompanying mode, when receiving an emergency brake command, controlling an Electronic Stability Program ESP to decelerate the vehicle at a preset deceleration in the driving accompanying mode, and sending a fuel cut-off request signal to an Engine Management System EMS to cut off a torque output of an engine.

8 Claims, 3 Drawing Sheets

---

In response to receiving a first trigger signal indicating that the vehicle enters a driving accompanying mode, activate the driving accompanying mode — 101

In the driving accompanying mode, in response to receiving an emergency brake command, control an Electronic Stability Program ESP to decelerate the vehicle at a preset deceleration in the driving accompanying mode, and send a fuel cut-off request signal to an Engine Management System EMS to cut off a torque output of an engine — 102

(51) Int. Cl.
*B60Q 1/44* (2006.01)
*B60W 10/06* (2006.01)
*B60W 10/10* (2012.01)
*B60W 10/18* (2012.01)
*B60W 30/182* (2020.01)
*B60Q 9/00* (2006.01)

(52) U.S. Cl.
CPC ............... *B60Q 9/00* (2013.01); *B60W 10/06* (2013.01); *B60W 10/10* (2013.01); *B60W 10/182* (2013.01); *B60W 30/182* (2013.01); B60W 2510/18 (2013.01); B60W 2520/04 (2013.01); B60W 2540/12 (2013.01); B60W 2710/0627 (2013.01); B60W 2710/1005 (2013.01); B60W 2710/18 (2013.01); B60Y 2300/02 (2013.01); B60Y 2300/18108 (2013.01)

(56) References Cited

U.S. PATENT DOCUMENTS 8,997,913 B2 * 4/2015 Enzaki ................ B60W 10/184
180/275
9,604,625 B2 * 3/2017 Hilberer .............. B60W 10/184
2017/0043767 A1 2/2017 Khafagy et al.

FOREIGN PATENT DOCUMENTS

| | | |
|---|---|---|
| CN | 102490598 A | 6/2012 |
| CN | 203332092 U | 12/2013 |
| CN | 103770774 A | 5/2014 |
| CN | 204279400 U | 4/2015 |
| CN | 105196993 A | 12/2015 |
| DE | 10258617 A1 | 1/2004 |
| DE | 102004031305 A1 | 1/2006 |
| DE | 102006041218 A1 | 8/2007 |
| DE | 102012007679 A1 | 10/2013 |
| DE | 102013203775 A1 | 9/2014 |
| JP | 2009166656 A | 7/2009 |
| KR | 20070061654 A | 6/2007 |
| KR | 20100027794 A | 3/2010 |

OTHER PUBLICATIONS

CN Search Report for CN 2017107653036 dated Mar. 27, 2019, 3 pages.
Extended European Search Report for EP 18851081 dated Aug. 27, 2020, 7 pages.

* cited by examiner

EMERGENCY BRAKE CONTROL METHOD AND DEVICE, ECU AND VEHICLE

CROSS-REFERENCE TO RELATED APPLICATIONS

This application is the National Phase of International Application PCT/CN2018/103328, filed Aug. 30, 2018, which designated the United States. This application also includes a claim of priority under 35 U.S.C. § 119(a) and § 365(b) to Chinese Application No. 201710765303.6 filed Aug. 30, 2017, the entirety of which is hereby incorporated by reference.

This application claims the priority to Chinese Patent Application No. 201710765303.6 filed to State Intellectual Property Office of The P.R.C on Aug. 30, 2017, and titled "EMERGENCY BRAKE METHOD AND DEVICE, AND ECU", the entire contents of which are incorporated herein by reference.

FIELD OF TECHNOLOGY

The disclosure relates to the field of vehicle technologies, and more particularly, to an emergency brake control method, device, ECU and vehicle.

BACKGROUND

At present, most major vehicle brands are developing an EPB (Electrical Park Brake) system. The EPB system is a one-button parking system that replaces a traditional pull rod hand brake. The form of changing the pull rod into the button not only saves layout space in the vehicle, but also adds some additional safety and comfort functions on the basis of realizing the parking function. However, the EPB system is only limited to the normal use of a skilled driver. In case of emergency, a novice driver can perform emergency braking by pulling an EPB switch for a long time. However, the vehicle will also encounter the following situations: brake deceleration achieved by pulling the EPB switch for a long time is only 0.4 g or 0.6 g, resulting in severe traffic accidents due to a long brake distance; the brake is realized by pulling the EPB switch for a long time, but the driver continues to press an accelerator pedal due to nervousness. At this time, a CDP (Controller Deceleration Parking) system will quit the brake, and the vehicle will accelerate, which is easy to cause traffic accidents. In addition, the driver always pulls up the EPB switch to perform braking. Once the EPB switch is released in case of emergency, the CDP system will quit, thus causing traffic accidents, property losses, casualties and other accidents.

SUMMARY

In light of this, the application aims to provide an emergency brake control method, so as to solve the problems that an EPB system has a long brake distance and is easy to quit brake in an emergency.

To achieve the above object, the technical solutions of the application are implemented as follows.

An emergency brake control method deployed in a vehicle, includes:

when receiving a first trigger signal indicating that the vehicle enters a driving accompanying mode, activating the driving accompanying mode; and in the driving accompanying mode, when receiving an emergency brake command, controlling an Electronic Stability Program ESP to decelerate the vehicle at a preset deceleration in the driving accompanying mode, and sending a fuel cut-off request signal to an Engine Management System EMS to cut off a torque output of an engine.

Preferably, when receiving the emergency brake command, the method further includes:

sending a request to change to a neutral gear to a Transmission Control Unit TCU; and after the vehicle is braked to be stationary, controlling the Electronic Stability Program ESP to send a parking request to an Electronic Park Brake EPB system, so that the Electronic Park Brake EPB system performs parking brake.

Preferably, when receiving the emergency brake command, the method further includes at least one of the following operations:

controlling a parking indicator in an instrument to flicker and make an alarm sound; and controlling a rear brake taillight to turn on.

Preferably, the method further includes:

after the vehicle stops, when receiving a second trigger signal indicating that the vehicle quits the driving accompanying mode or a vehicle reactivating signal in the driving accompanying mode, quitting the driving accompanying mode.

Preferably, when receiving the first trigger signal indicating that the vehicle enters the driving accompanying mode, the activating the driving accompanying mode includes:

when a brake pedal works and a pulling duration of the Electronic Park Brake EPB switch meets a set duration, activating the driving accompanying mode.

Compared with the prior art, the emergency brake control method according to the application has the following advantages:

when receiving the first trigger signal indicating that the vehicle enters the driving accompanying mode, the driving accompanying mode is activated; and in the driving accompanying mode, when receiving the emergency brake command, the ESP is controlled to decelerate the vehicle at the preset deceleration in the driving accompanying mode, and send the fuel cut-off request signal to the EMS to cut off the torque output of the engine. Through the embodiment of the application, after activating the driving accompanying mode, the ESP will decelerate the vehicle according to the preset deceleration response to emergency brake and control a brake distance, preventing a traffic accident caused by an overlong brake distance of the EPB system. Meanwhile, the EMS cuts off a fuel path, such that the vehicle will not accelerate and is braked effectively even if a driver steps on an accelerator by mistake or releases an EPB switch, preventing traffic accidents, property losses and casualties caused by quitting the brake.

Another object of the application aims to provide an emergency brake control device, so as to solve the problems that an EPB system has a long brake distance and is easy to quit brake in an emergency.

To achieve the above object, the technical solutions of the application are implemented as follows.

An emergency brake control method deployed in a vehicle, includes:

an activating module configured to, when receiving a first trigger signal indicating that the vehicle enters a driving accompanying mode, activate the driving accompanying mode; and an emergency brake module configured to, in the driving accompanying mode, when receiving an emergency brake command, control an Electronic Stability Program ESP to decelerate the vehicle at a preset deceleration in the driving accompanying mode, and send a fuel cut-off request signal to an Engine Management System EMS to cut off a torque output of an engine.

Preferably, the device further includes:

a gear change sending module configured to send a request to change to a neutral gear to a Transmission Control Unit TCU; and a parking request sending module configured to, after the vehicle is braked to be stationary, control the Electronic Stability Program ESP to send a parking request to an Electronic Park Brake EPB system, so that the Electronic Park Brake EPB system performs parking brake.

Preferably, the device further includes at least one of the following modules:

an instrument control module configured to control a parking indicator in an instrument to flicker and make an alarm sound; and a taillight control module configured to control a rear brake taillight to turn on.

Preferably, the device further includes:

a quitting module configured to, after the vehicle stops, when receiving a second trigger signal indicating that the vehicle quits the driving accompanying mode or a vehicle reactivating signal in the driving accompanying mode, quit the driving accompanying mode.

The emergency brake control device has the same advantages as that of the above-mentioned emergency brake control method compared with the prior art, which will not be elaborated herein.

Another object of the application aims to provide an Electronic Control Unit ECU, so as to solve the problems that an EPB system has a long brake distance and is easy to quit brake in an emergency.

To achieve the above object, the technical solutions of the application are implemented as follows.

An Electronic Control Unit ECU includes the emergency brake control device as described above.

The ECU has the same advantages as that of the above-mentioned emergency brake control device compared with the prior art, which will not be elaborated herein.

Another object of the application aims to provide a vehicle, so as to solve the problems that an EPB system has a long brake distance and is easy to quit brake in an emergency.

To achieve the above object, the technical solutions of the application are implemented as follows.

A vehicle includes the emergency brake control device as described above.

The vehicle has the vehicle same advantages as that of the above-mentioned emergency brake control device compared with the prior art, which will not be elaborated herein.

Another object of the application aims to provide a storage medium storing the emergency brake control method as described above, so as to solve the problems that an EPB system has a long brake distance and is easy to quit brake in an emergency.

BRIEF DESCRIPTION OF THE DRAWINGS

The accompanying drawings constituting a part of the application are used to provide a further understanding of the application, and the illustrative embodiments of the application and the description thereof serve to explain the application, and do not constitute any inappropriate limitation to the application. In the drawings.

DESCRIPTION OF THE EMBODIMENTS

It should be noted that, in case of no conflict, the embodiments in the application and the features in the embodiments may be combined with each other. The application will be explained in detail with reference to the accompanying drawings and embodiments hereinafter.

First Embodiment

An emergency brake control method provided by an embodiment of the application is introduced in details.

Figure 1:
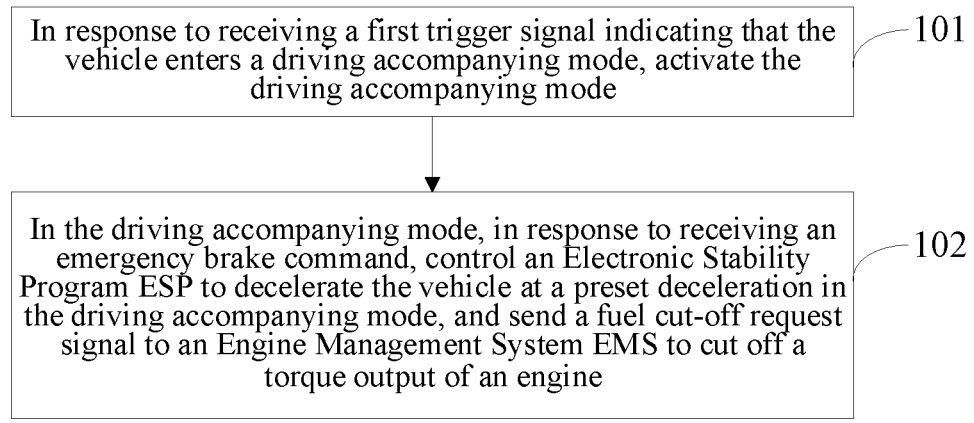
FIG. 1 is a flow chart of steps of an emergency brake control method according to a first embodiment of the application.

FIG. 1 illustrates a flow chart of steps of an emergency brake control method provided by an embodiment of the application, which is applied to in a vehicle, including the following steps.

In step 101, when receiving a first trigger signal indicating that the vehicle enters a driving accompanying mode, the driving accompanying mode is activated.

In this embodiment, after the vehicle receives the first trigger signal indicating to enter the driving accompanying mode, the driving accompanying mode is activated. The driving accompanying mode is a mode used to assist a driver in controlling the vehicle during driving, especially to assist in controlling the vehicle to stop during service braking, so as to improve a safety performance. For example, when a novice driver learns or drives the vehicle, a user can assist in controlling the vehicle to stop when the user brakes in an emergency by using the driving accompanying mode, thus avoiding a danger of misoperation of the novice driver. The first trigger signal for entering the first trigger signal may be a signal triggered by pressing a driving accompanying key for a long time, a signal triggered by repeatedly depressing a brake pedal at a co-driver position, or a signal triggered when the brake pedal works and a pulling duration of an EPB switch meets a set duration. After receiving the first trigger signal indicating to enter the driving accompanying mode, the driving accompanying mode is activated. For instance, when the vehicle detects that the driver steps on the brake pedal while pulling the EPB switch for more than 3 s, the driving accompanying mode is activated. The set duration may be 3 s or 5 s, etc, and is not limited in the embodiment of the application in detail. After entering the driving accompanying mode, a driving accompanying indicator may be controlled to turn on or a display screen displays that the driving accompanying mode is entered, so as to prompt the user of being the driving accompanying mode at current.

In step 102, in the driving accompanying mode, when receiving an emergency brake command, an Electronic Stability Program ESP is controlled to decelerate the vehicle at a preset deceleration in the driving accompanying mode, and send a fuel cut-off request signal to an Engine Management System EMS (Engine Management System) to cut off a torque output of an engine.

In this embodiment, after the driving accompanying mode is activated, if the emergency brake command is received, the ESP decelerates the vehicle. Specifically, when detecting the first trigger signal during running, the vehicle sends the preset deceleration to the ESP, so that a hydraulic module decomposes the preset deceleration to four wheel cylinders to control pressure increasing of the four wheel cylinders thereby braking the vehicle. One or more preset decelerations may be set, and when a plurality of preset decelerations are set, a corresponding preset deceleration may be sent to the ESP according to a current vehicle speed. The corresponding preset deceleration may also be sent according to a safe distance detected by a distance sensor, and the preset deceleration may specifically be 0.4 g or 0.6 g. When sending the preset deceleration, the fuel cut-off request signal may be sent to the Engine Management System EMS (Engine Management System) at the same time. The fuel cut-off request signal may also be sent to the EMS within a set time such as 5 s after sending the preset deceleration. The fuel cut-off request signal may further be sent to the EMS within a set time such as 5 s after sending the preset deceleration. For example, after sending the preset deceleration to the ESP, the driver mistakenly steps on the accelerator and acceleration is detected within 1 s or 3 s, the fuel cut-off request signal is sent to the EMS. After receiving the fuel cut-off request signal, the EMS can cut off the torque output of the engine. At this moment, the vehicle will not accelerate and is braked effectively even if the driver steps on an accelerator by mistake or an accompanying driver releases an EPB switch since a fuel path is cut off, thus preventing traffic accidents, property losses and casualties.

In conclusion, in the embodiment of the application, when receiving the first trigger signal indicating that the vehicle enters the driving accompanying mode, the driving accompanying mode is activated; and in the driving accompanying mode, when receiving the emergency brake command, the ESP is controlled to decelerate the vehicle at the preset deceleration in the driving accompanying mode, and send the fuel cut-off request signal to the EMS to cut off the torque output of the engine. Through the embodiment of the application, after activating the driving accompanying mode, the ESP will decelerate the vehicle according to the preset deceleration response to emergency brake and control a brake distance, preventing a traffic accident caused by an overlong brake distance of the EPB system. Meanwhile, the EMS cuts off a fuel path, such that the vehicle will not accelerate and is braked effectively even if the driver steps on the accelerator by mistake or releases the EPB switch, preventing traffic accidents, property losses and casualties caused by quitting the brake.

Second Embodiment

Figure 2:
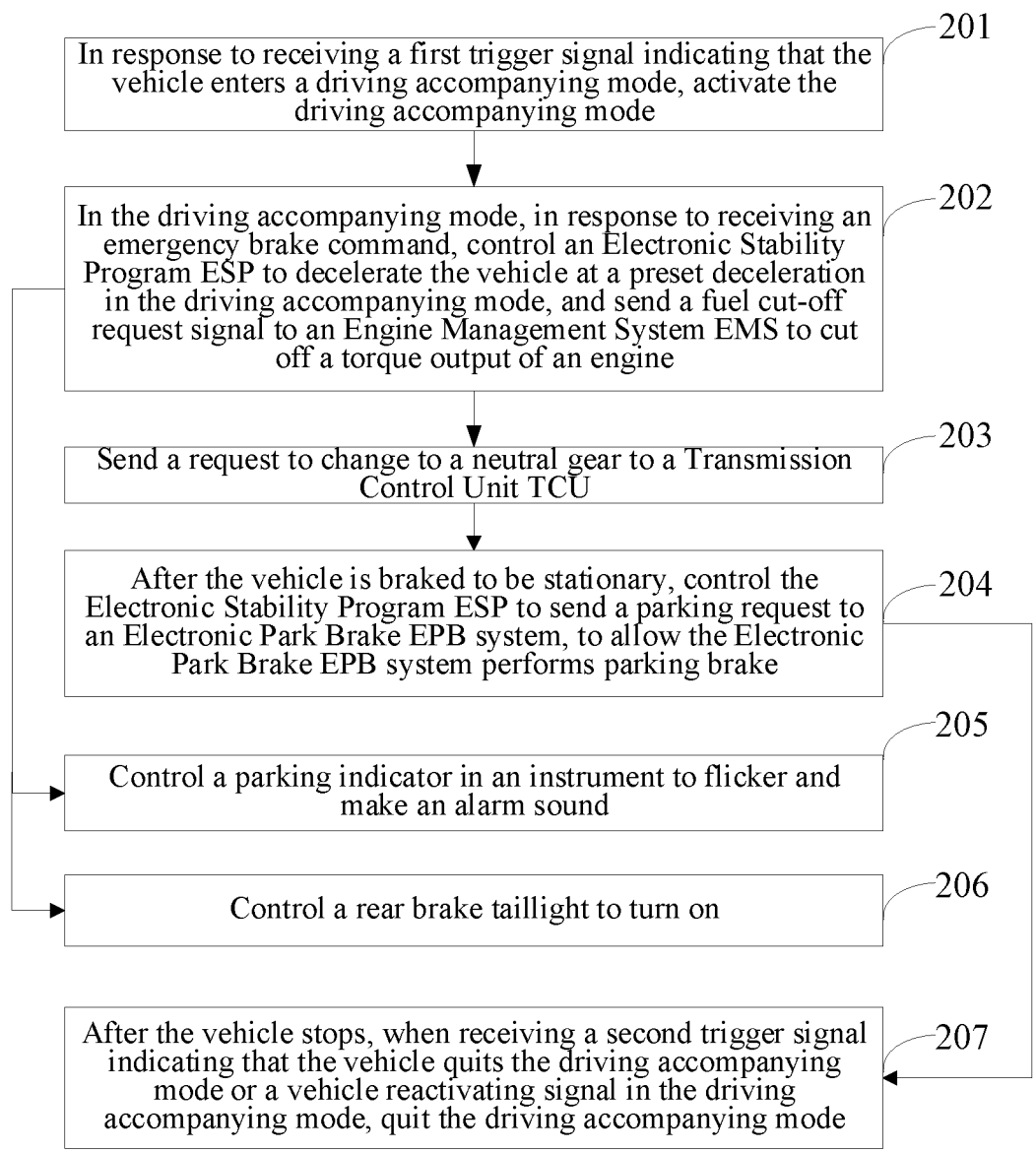
FIG. 2 is a flow chart of steps of an emergency brake control method according to a second embodiment of the application.

FIG. 2 illustrates a flow chart of steps of an emergency brake control method provided by an embodiment of the application, which is applied to in a vehicle, including the following steps.

In step 201, when receiving a first trigger signal indicating that the vehicle enters a driving accompanying mode, the driving accompanying mode is activated.

In step 202, in the driving accompanying mode, when receiving an emergency brake command, an Electronic Stability Program ESP is controlled to decelerate the vehicle at a preset deceleration in the driving accompanying mode, and send a fuel cut-off request signal to an Engine Management System EMS to cut off a torque output of an engine.

In step 203, when receiving the emergency brake command, a request to change to a neutral gear is sent to a Transmission Control Unit TCU (Transmission Control Unit).

In this embodiment, when receiving the emergency brake command, the request to change to the N gear (neutral gear), may be sent to the TCU in addition to decelerating the vehicle and cutting off a fuel path. The request to change to the N gear may either be sent when sending the preset deceleration to the TCU, or sent when sending the fuel cut-off request signal to the EMS, or sent according to a preset time. For instance, the request to change to the N gear is sent in 3 s or 5 s after receiving the emergency brake command.

In step 204, after the vehicle is braked to be stationary, the Electronic Stability Program ESP is controlled to send a parking request to an Electronic Park Brake EPB system, so that the Electronic Park Brake EPB system performs parking brake.

In the embodiment, after the vehicle is stationary by emergency braking, the Electronic Stability Program ESP is controlled to send the parking request to the Electronic Park Brake EPB system, so that the Electronic Park Brake EPB system performs the parking brake.

In step 205, when receiving the emergency brake command, a parking indicator in an instrument is controlled to flicker and make an alarm sound.

In this embodiment, when receiving the emergency brake command, a working command may also be sent to the instrument. After receiving the working command, the instrument controls the parking indicator (P indicator) to flicker. Meanwhile, the instrument may also make a "beep" alarm sound to prompt a driver and an accompanying driver.

In step 206, when receiving the emergency brake command, a rear brake taillight is controlled to turn on.

In this embodiment, when receiving the emergency brake command, a working command may also be sent to the rear brake taillight, and the rear brake taillight is turned on after receiving the working command, so as to prompt a rear vehicle and avoid rear-end collision.

In step 207, after the vehicle stops, when receiving a second trigger signal indicating that the vehicle quits the driving accompanying mode or a vehicle reactivating signal in the driving accompanying mode, the driving accompanying mode is quitted.

In this embodiment, after the vehicle stops, the driving accompanying mode can be quitted when receiving the second trigger signal indicating that the vehicle quits the driving accompanying mode or receiving the vehicle reactivating signal. The second trigger signal may be the same as or different from the first trigger signal. For instance, the first trigger signal for entering the first trigger signal may be a signal triggered by pressing a driving accompanying key for a long time, and the second trigger signal for quitting the driving accompanying mode is a signal triggered when a brake pedal works and a pulling duration of an EPB switch meets a set duration. The vehicle reactivating signal may be a vehicle ignition signal or a signal indicating that the vehicle changes to a designated gear such as $1^{st}$ gear.

In conclusion, in the embodiment of the application, when receiving the first trigger signal indicating that the vehicle enters the driving accompanying mode, the driving accompanying mode is activated; and in the driving accompanying mode, when receiving the emergency brake command, the ESP is controlled to decelerate the vehicle at the preset deceleration in the driving accompanying mode, and send the fuel cut-off request signal to the EMS to cut off the torque output of the engine. Through the embodiment of the application, after activating the driving accompanying mode, the ESP will decelerate the vehicle according to the preset deceleration in response to emergency brake and control a brake distance, preventing a traffic accident caused by an overlong brake distance of the EPB system. Meanwhile, the EMS cuts off the fuel path, such that the vehicle will not accelerate and is braked effectively even if the driver steps on the accelerator by mistake or releases the EPB switch, preventing traffic accidents, property losses and casualties caused by quitting the brake.

Third Embodiment

Figure 3:
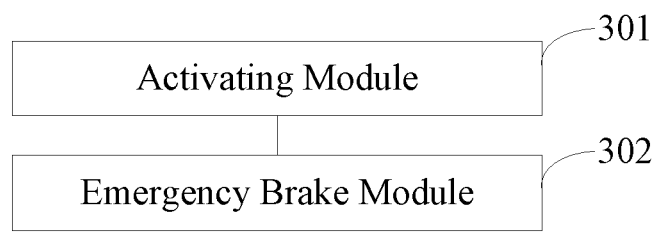
FIG. 3 is a first structural block diagram of an emergency brake control device according to a third embodiment of the application.

FIG. 3 illustrates a structural block diagram of an emergency brake control device provided by an embodiment of the application, which is deployed in a vehicle, including:

an activating module 301 configured to, when receiving a first trigger signal indicating that the vehicle enters a driving accompanying mode, activate the driving accompanying mode; and an emergency brake module 302 configured to, in the driving accompanying mode, when receiving an emergency brake command, control an Electronic Stability Program ESP to decelerate the vehicle at a preset deceleration in the driving accompanying mode, and send a fuel cut-off request signal to an Engine Management System EMS to cut off a torque output of an engine.

In this embodiment, after receiving the first trigger signal, the vehicle enters the driving accompanying mode. In the driving accompanying mode, after receiving the emergency braking command, the preset deceleration is sent to the ESP, so that a hydraulic module decomposes the preset deceleration to four wheel cylinders to control pressure increasing of the four wheel cylinders thereby braking the vehicle. Moreover, the fuel cut-off request signal is sent to the EMS, and the EMS cuts off the torque output of the engine after receiving the fuel cut-off request signal. At this moment, the vehicle will not accelerate and is braked effectively even if a driver steps on an accelerator by mistake or an accompanying driver releases an EPB switch since a fuel path is cut off, thus preventing traffic accidents, property losses and casualties.

Figure 4:
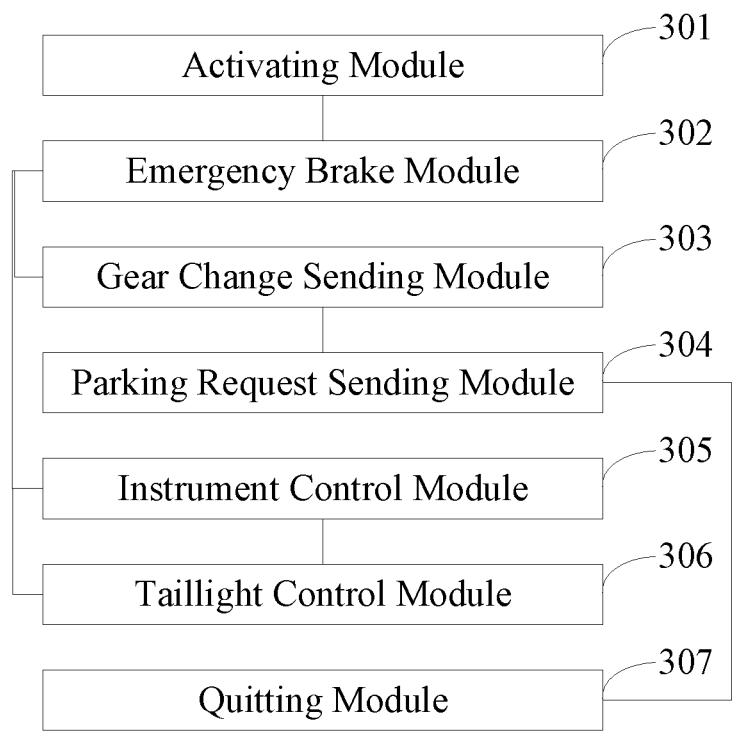
FIG. 4 is a second structural block diagram of an emergency brake control device according to the third embodiment of the application.

Optionally, as shown in FIG. 4, the device further includes:

a gear change sending module 303 configured to send a request to change to a neutral gear to a Transmission Control Unit TCU; and a parking request sending module 304 configured to, after the vehicle is braked to be stationary, control the Electronic Stability Program ESP to send a parking request to an Electronic Park Brake EPB system, so that the Electronic Park Brake EPB system performs parking brake.

In this embodiment, the request to change to the neutral gear is sent to the TCU. After receiving the request to change to the neutral position, the TCU changes a current gear to the neutral gear. In other words, no power is output to driving wheels. The vehicle does not stall but will not run. After the vehicle is stationary by emergency braking, the Electronic Stability Program ESP is controlled to send the parking request to the Electronic Park Brake EPB system, so that the Electronic Park Brake EPB system performs the parking brake.

Preferably, as shown in FIG. 4, the device further includes at least one of the following modules:

an instrument control module 305 configured to control a parking indicator in an instrument to flicker and make an alarm sound; and a taillight control module 306 configured to control a rear brake taillight to turn on.

Optionally, as shown in FIG. 4, the device further includes:

a quitting module 307 configured to, after the vehicle stops, when receiving a second trigger signal indicating that the vehicle quits the driving accompanying mode or a vehicle reactivating signal in the driving accompanying mode, quit the driving accompanying mode.

In conclusion, in the embodiment of the application, when receiving the first trigger signal indicating that the vehicle enters the driving accompanying mode, the driving accompanying mode is activated; and in the driving accompanying mode, when receiving the emergency brake command, the ESP is controlled to decelerate the vehicle at the preset deceleration in the driving accompanying mode, and send the fuel cut-off request signal to the EMS to cut off the torque output of the engine. Through the embodiment of the application, after activating the driving accompanying mode, the ESP will decelerate the vehicle according to the preset deceleration in response to emergency brake and control a brake distance, preventing a traffic accident caused by an overlong brake distance of the EPB system. Meanwhile, the EMS cuts off the fuel path, such that the vehicle will not accelerate and is braked effectively even if the driver steps on the accelerator by mistake or releases the EPB switch, preventing traffic accidents, property losses and casualties caused by quitting the brake.

Fourth Embodiment

An Electronic Control Unit ECU provided by an embodiment of the application is introduced in details.

The Electronic Control Unit ECU provided by the embodiment of the application includes the emergency brake control device according to the third embodiment.

The emergency brake control method is deployed in a vehicle, including:

an activating module configured to, when receiving a first trigger signal indicating that the vehicle enters a driving accompanying mode, activate the driving accompanying mode; and an emergency brake module configured to, in the driving accompanying mode, when receiving an emergency brake command, control an Electronic Stability Program ESP to decelerate the vehicle at a preset deceleration in the driving accompanying mode, and send a fuel cut-off request signal to an Engine Management System EMS to cut off a torque output of an engine.

An embodiment of the application further provides a vehicle, wherein the vehicle includes the emergency brake control device according to the third embodiment.

An embodiment of the application further provides a storage medium, wherein the storage medium stores the emergency brake control method according to the first embodiment.

In conclusion, in the embodiment of the application, the ECU includes the above-mentioned emergency brake control device, the vehicle includes the above-mentioned emergency brake control device, and the emergency brake control device includes the activating module and the emergency brake module. Through the embodiment of the application, after activating the driving accompanying mode, the ESP will decelerate the vehicle according to the preset deceleration in response to emergency brake and control a brake distance, preventing a traffic accident caused by an overlong brake distance of the EPB system. Meanwhile, the EMS cuts off the fuel path, such that the vehicle will not accelerate and is braked effectively even if the driver steps on the accelerator by mistake or releases the EPB switch, preventing traffic accidents, property losses and casualties caused by quitting the brake.

Those described above are merely preferred embodiments of the application, but are not intended to limit the application. Any modifications, equivalent substitutions and improvements made without departing from the principle of the application shall all fall in the scope of protection of the application.

What is claimed is:

1. An emergency brake control method applied to a vehicle, comprising:
   in response to receiving a first trigger signal indicating that the vehicle enters a driving accompanying mode, activating the driving accompanying mode; and
   in the driving accompanying mode, in response to receiving an emergency brake command, controlling an Electronic Stability Program (ESP) to decelerate the vehicle at a preset deceleration in the driving accompanying mode, and sending a fuel cut-off request signal to an Engine Management System (EMS) to cut off a torque output of an engine;
   wherein in response to receiving the emergency brake command, the method further comprises:
   sending a request to change to a neutral gear to a Transmission Control Unit (TCU); and after the vehicle is braked to be stationary, controlling the Electronic Stability Program (ESP) to send a parking request to an Electronic Park Brake (EPB) system, to allow the Electronic Park Brake (EPB) system to perform parking brake.

2. The method according to claim 1, wherein in response to receiving the emergency brake command, the method further comprises at least one of the following operations:
   controlling a parking indicator in an instrument to flicker and make an alarm sound; and
   controlling a rear brake taillight to turn on.

3. The method according to claim 1, further comprising:
   after the vehicle stops, in response to receiving a second trigger signal indicating that the vehicle quits the driving accompanying mode or a vehicle reactivating signal in the driving accompanying mode, quitting the driving accompanying mode.

4. The method according to claim 1, wherein in response to receiving the first trigger signal indicating that the vehicle enters the driving accompanying mode, the activating the driving accompanying mode comprises:
   when a brake pedal works and a pulling duration of the Electronic Park Brake (EPB) switch meets a set duration, activating the driving accompanying mode.

5. An emergency brake control method deployed in a vehicle, comprising:
   an activating module configured to, when receiving a first trigger signal indicating that the vehicle enters a driving accompanying mode, activate the driving accompanying mode; and
   an emergency brake module configured to, in the driving accompanying mode, in response to receiving an emergency brake command, control an Electronic Stability Program (ESP) to decelerate the vehicle at a preset deceleration in the driving accompanying mode, and send a fuel cut-off request signal to an Engine Management System (EMS) to cut off a torque output of an engine;
   a gear change sending module configured to, send a request to change to a neutral gear to a Transmission Control Unit (TCU); and
   a parking request sending module configured to, after the vehicle is braked to be stationary, control the Electronic Stability Program (ESP) to send a parking request to an Electronic Park Brake (EPB) system, to allow the Electronic Park Brake (EPB) system to perform parking brake.

6. The device according to claim 5, further comprising at least one of the following modules:
   an instrument control module configured to control a parking indicator in an instrument to flicker and make an alarm sound; and
   a taillight control module configured to control a rear brake taillight to turn on.

7. The device according to claim 5, further comprising:
   a quitting module configured to, after the vehicle stops, in response to receiving a second trigger signal indicating that the vehicle quits the driving accompanying mode or a vehicle reactivating signal in the driving accompanying mode, quit the driving accompanying mode.

8. An Electronic Control Unit (ECU), comprising the emergency brake control device according to claim 5.

* * * * *